(12) United States Patent
Kammer et al.

(10) Patent No.: US 8,350,560 B2
(45) Date of Patent: Jan. 8, 2013

(54) ELECTROMECHANICAL TRANSDUCER DEVICE

(75) Inventors: Thomas Kammer, Biebertal (DE); Falk Uhlenbruck, Hohenahr (DE)

(73) Assignee: ECS Engineered Control Systems AG, Gallen (CH)

(*) Notice: Subject to any disclaimer, the term of this patent is extended or adjusted under 35 U.S.C. 154(b) by 520 days.

(21) Appl. No.: 12/677,446

(22) PCT Filed: Jun. 5, 2009

(86) PCT No.: PCT/EP2009/004033
§ 371 (c)(1),
(2), (4) Date: Mar. 10, 2010

(87) PCT Pub. No.: WO2009/152964
PCT Pub. Date: Dec. 23, 2009

(65) Prior Publication Data
US 2010/0207614 A1    Aug. 19, 2010

(30) Foreign Application Priority Data
Jun. 18, 2008   (DE) .......................... 10 2008 028 618

(51) Int. Cl.
*G01B 7/30* (2006.01)
(52) U.S. Cl. ........... 324/207.22; 324/207.2; 324/207.21; 324/207.25
(58) Field of Classification Search ............. 324/207.22, 324/207.2, 207.25
See application file for complete search history.

(56) References Cited

U.S. PATENT DOCUMENTS
2008/0041182 A1   2/2008  Giefer et al.
2009/0115407 A1   5/2009  Takigawa FOREIGN PATENT DOCUMENTS
| DE | 19749330 A1 | 5/1999 |
| DE | 10231015 A1 | 3/2004 |
| DE | 102004056800 A1 | 6/2006 |
| DE | 202007000210 U1 | 3/2007 |
| EP | 0075693 A1 | 4/1983 |
| EP | 1772649 A1 | 4/2007 |
| EP | 2058561 A2 | 5/2009 |
| GB | 2091423 A | 7/1982 |
| JP | 60091047 A | 5/1985 |
| JP | 04002914 A | 1/1992 |
| JP | 2008-032155 A | 2/2008 |

OTHER PUBLICATIONS

Notice of Reasons for Rejection dated Jul. 24, 2012 for the parallel Japanese Patent Application No. P2010-532624.

*Primary Examiner* — Reena Aurora
(74) *Attorney, Agent, or Firm* — Connolly Bove Lodge & Hutz LLP

(57) ABSTRACT

An electromechanical transducer device for a vehicle transmission or drive has a lever (1) that can be pivotally actuated about at least one first axis (2a, 2b) and which is mechanically decoupled from the transmission or drive. The lever is supported by a suspension (3) on the first axis (2a, 2b). The axis (2a, 2b) comprises at least one first component (6a, 6b) of a magnetic rotational angle sensor system (6a, 6b, 7a, 7b) at an axial end section to detect angular position or rotational movement of the lever (1). A second component (7a, 7b) of the rotational angle sensor system is arranged on the suspension (3) opposite of the end section of the axis (2a, 2b), wherein the axial end section is located within the suspension (3). A circuit board (15) accommodating the rotational angle sensors (7a, 7b) is arranged on the suspension (3), and the circuit board (15) comprises at least one flange-like extension (17, 18) protruding from the circuit board plane.

13 Claims, 8 Drawing Sheets

ELECTROMECHANICAL TRANSDUCER DEVICE

CROSS-REFERENCE TO RELATED APPLICATIONS

This application is a national stage application (under 35 U.S.C. §371) of PCT/EP2009/004033, filed Jun. 5, 2009, which claims benefit of German application 10 2008 028 618.4, filed Jun. 18, 2008.

DESCRIPTION

The invention relates to an electromechanical transducer device for controlling at least one function of a vehicle transmission or drive arranged physically separate from the transducer.

BACKGROUND AND STATE OF THE ART

Electromechanical transducer devices for controlling functions of a vehicle transmission or of a vehicle drive such as gearshift levers that can be moved into various different shifting positions are known as such in the state of the art. When it comes to gearshift levers for manual or automatic transmissions, it is common practice to employ a plurality of different Hall sensors in order to detect the various shifting positions such as P, N, R, D of the gearshift lever. In this context, it is provided to arrange a circuit board in parallel to the swiveling shaft of the lever, said circuit board being fitted with individual Hall sensors located at a distance from each other.

Here, the arrangement of the Hall sensors is configured in such a way that each individual Hall sensor can detect one specific position of the gearshift and selector lever. Such Hall sensors are also configured to generate a binary signal that provides information about whether a magnetic element arranged on the gearshift or selector lever is located opposite from the Hall sensor. A plurality of Hall sensors located at a distance from each other have to be arranged so as to be distributed over a relatively large surface area and they have to be electrically contacted so that every conceivable shifting position of the gearshift lever can be unambiguously detected.

German utility model DE 20 2007 000 210 U1 describes a shift-by-wire actuation device for a vehicle transmission. The device consists of a gearshift lever that is mounted on a first shaft by means of a gearshift lever receptacle. On a bearing journal of the gearshift lever receptacle, there is a permanent magnet that cooperates with an oppositely positioned Hall sensor in order to directly detect the angle position of the gearshift lever.

European patent application EP 0 075 693 A1 describes a speed selector for a transmission in which the position of a gearshift lever can be detected contact-free by means of magnet-sensitive sensors and by means of magnets affixed to the gearshift lever. The individual magnet-sensitive sensors are arranged here in such a way that a dedicated sensor is provided for each gearshift lever position that is to be distinguished, or else fewer sensors than the number of gears are provided, whereby then the position of the gearshift lever can be ascertained according to a code from the combination of the sensors that are being actuated in each case.

A drawback of such prior-art transducer devices is the use of a plurality of Hall sensors and the relatively large surface area of the circuit board associated with them. This is particularly disadvantageous in terms of the limited installation space available in the vehicle.

Moreover, such position-detection devices commonly employed in the state of the art have to be individually adapted to the geometry and the configuration of the gearshift or selector lever. As a result, a circuit board that has been especially configured and adapted to the given circumstances is always needed for different vehicle types with their different gearshifts and selector levers. This proves to be very much of a drawback, especially in case of a wide range of gearshift or selector mechanisms with gearshift levers of different lengths. Especially when a vehicle is configured as a variant with the steering wheel on the left or on the right, this calls for an arrangement and configuration of the circuit board that is adapted to the variant with the steering wheel on the left or on the right in terms of the gearshift or selector lever.

SUMMARY OF THE INVENTION

The invention is thus based on an objective of putting forward a simplified transducer device for controlling a drive or transmission of a motor vehicle which has a simple, easy-to-install structure, which exhibits a high level of functional reliability, particularly for detecting the shifting positions of the gearshift and selector lever, which works with considerably fewer sensor elements, which can be universally adapted to different transducer devices and which can be produced very cost-effectively.

The transducer device according to one aspect of the invention is configured for controlling at least one function of a vehicle transmission or drive arranged physically separate from the transducer, and it has a lever that can be actuated so as to swivel around at least one first shaft, said lever being mechanically uncoupled from the transmission or drive that is to be actuated. The setting movement or set position of the lever can thus be converted into electric signals that are then ultimately employed to control the function of the transmission or drive. The lever of the transducer device is mounted on a first shaft by means of a suspension, whereby the shaft has a first component of a magnetic rotation angle sensor arrangement on an end section that comes to lie inside the suspension and, for purposes of directly detecting the angle position or the rotational movement of the lever, it cooperates with a second component of the rotation angle sensor arrangement that is arranged on the suspension, opposite from the end section of the shaft. In this context, the invention is characterized in that, instead of having several Hall sensors arranged physically separate from each other, now a single rotation angle sensor is fundamentally sufficient to detect not only the angle position but also a rotational or swiveling movement of the lever, and to associate this angle position with a prescribed set position by means of an electronic evaluation unit located downstream. The term first and second components of a magnetic rotation angle sensor arrangement refers to their pair-wise corresponding elements, namely, a rotation angle sensor element and a magnetic element that generates a magnetic field. In this context, it is immaterial which of the two components is arranged on the suspension and which of the two components is arranged on the shaft that constitutes the point of rotation.

The suspension is configured so as to hold a bearing bolt that extends essentially perpendicular to the first shaft, and that is rigidly joined to the lever that is to be activated by the user. Here, a circuit board that holds the rotation angle sensors is arranged directly on the suspension itself. The circuit board has at least one approximately flange-like extension that protrudes from the plane of the circuit board, whereby at least one of the rotation angle sensor elements can be arranged on said extension. Here, it is especially provided that the surface normal of this extension and consequently also the surface normal of the rotation angle sensor element arranged on it extend essentially parallel to the first shaft. As a result, a swiveling movement of the suspension relative to the first shaft as well as the resultant angle position of the lever that is forcibly guided on the suspension relative to the first shaft can be ascertained precisely and unambiguously.

According to a first advantageous embodiment of the invention, it is provided that one single rotation angle sensor element is provided in order to ascertain the angle position or the rotational movement of the lever relative to the first shaft. Here, the rotation angle sensor element is configured as an integrated circuit and internally, it can have a plurality of individual magneto resistive elements or elements based on the Hall effect that are oriented differently relative to each other on a circuit board or inside the sensor element, and that are electrically coupled to each other, so that an electric signal that can be picked-up makes it possible to unambiguously obtain information about the relative orientation of the rotation angle sensor element with respect to the externally applied magnetic field.

The individual magneto resistive elements of the rotation angle sensor element can be configured especially as so-called GMR elements or AMR elements that utilize the so-called giant magneto resistive effect or the anisotropic magneto resistive effect in order to detect and quantify the magnetic field. In particular, it is provided that the sensor is configured as a so-called 360°-sensor, which provides an unambiguous electric signal corresponding to the set angle for each set position and angle position of the magnetic element. As an alternative or in addition thereto, the rotation angle sensors can be based exclusively on the utilization of the Hall effect, so that the integrated circuits provided according to the invention can have also have, instead of magneto resistive elements, individual Hall elements that are electrically coupled to each other.

By providing one single rotation angle sensor element in the area of the swiveling shaft of the lever or of the suspension that holds the lever, it is advantageously possible to dispense with the implementation of a plurality of Hall sensors that are physically separate from each other. The electric signal that can be generated by the rotation angle sensor element yields direct information about the current position or angular velocity of the magnetic element that is magnetically coupled to the rotation angle sensor or that is mechanically coupled to the lever or to the suspension.

The inventive arrangement of a single rotation angle sensor element can also markedly reduce the circuitry required for the detection of swiveling or rotational movement. After all, now it is no longer necessary to electrically couple a plurality of individual sensor elements, for instance, Hall sensors, but rather, only the output of a single rotation angle sensor element has to be coupled to an evaluation unit located downstream, which can ascertain the rotation angle and/or the angular velocity of the lever as a function of the amplitude or frequency of the signal generated by the rotation angle sensor.

The arrangement of a rotation angle sensor element in the immediate vicinity of the swiveling shaft also entails the advantage that such a detection of the angle or of the position can be carried out completely independently of the concrete configuration of the lever that can swivel around this shaft. Consequently, the arrangement according to the invention can be universally adapted to all kinds of configurations of transducer devices. Here, as well, it is no longer relevant whether the transducer device is provided for a variant of a vehicle with the steering wheel on the left or on the right. Moreover, it is advantageously possible to dispense with a circuit board that runs parallel to the swiveling shaft of the lever, so that, in the final analysis, valuable installation space can be saved.

According to another advantageous embodiment of the invention, it is provided that the first component of the rotation angle sensor arrangement is configured as a magnetic element that generates a magnetic field, while the second component of the rotation angle sensor arrangement is configured as a rotation angle sensor. By nature, the magnetic element has a magnetic north pole and a magnetic south pole that breaks the symmetry of the shaft on which the suspension is attached. In this context, it is particularly provided that one of the components of the rotation angle sensor arrangement, especially the magnetic element that generates the magnetic field, is arranged non-rotatably on the face of an end section of the shaft, and the corresponding other component, that is to say, the rotation angle sensor element is arranged on the suspension in an imaginary axial extension of the shaft.

Here, the shaft itself or its bearing bolt can be arranged stationary relative to the chassis of the vehicle, so that any pivoting of the rotation angle sensor relative to the stationary magnetic element leads to the generation of signals that can be evaluated. Naturally, the opposite configuration is likewise conceivable, in which the sensor itself is arranged so as to be stationary with respect to the chassis of the vehicle, while the magnetic element opposite from it undergoes a swiveling or rotational movement. After all, in order to determine the rotation angle or the position, the decisive aspect is the relative movement between the elements that make up the rotation angle sensor arrangement, the magnetic element and the rotation angle sensor.

According to another advantageous embodiment of the invention, it is provided that the rotation angle sensor is configured essentially flat, especially on a circuit board and it is oriented with its surface normal essentially parallel to the first shaft on which the magnetic element can be arranged. Here, the rotation angle sensor can be arranged offset in parallel to the shaft. Preferably, however, it is arranged so as to be flush and in the axial extension with respect to the shaft.

As an alternative or in addition for purposes of redundancy, it can be provided for the magnetic element to be arranged on the shaft and for the appertaining sensor element to be oriented with respect to the shaft on the lever or on its suspension in such a way that its surface normal faces in the radial direction relative to the shaft. Here, too, an appertaining relative movement between the rotation angle sensor and the magnetic element can be unambiguously detected, converted into an electric signal that corresponds to the angle position and then relayed to an evaluation unit located downstream.

Moreover, it is provided according to the invention that the lever passes through a slot of the suspension at a radial distance from the first shaft, said slot extending parallel to the axial extension of the first shaft and limiting a swiveling movement of the lever around a second shaft relative to the suspension. Therefore, it is particularly provided for the transducer device that a swiveling movement of the lever that can be initiated by a user with the first shaft as the swiveling shaft in the area of the slot guide is transferred into a swiveling movement of the suspension oriented perpendicular to the longitudinal extension of the slot.

The slot guide thus causes every swiveling movement originating with the lever by the first shaft as the swiveling shaft to be transferred to the suspension virtually at a ratio of one-to-one. The slot guide thus performs a carry-along function with respect to the first shaft as the swiveling shaft. In a direction perpendicular thereto, it is provided that the lever itself is pivotably hinged on the suspension with the second shaft as the swiveling shaft. This second swiveling movement allows the lever to pivot relative to its suspension in the direction perpendicular to the coupled swiveling movement of the lever and suspension by the first shaft as the rotation shaft.

Relative to the longitudinal extension of the lever, the two shafts, i.e. the first and second shafts, are arranged at approximately the same height. However, an offset arrangement is likewise possible.

In the case of the automatic transmission of a vehicle, these two swiveling shafts can be employed, for instance, to move the gearshift lever along one swiveling direction into the various shifting positions P, N, R, D, while the lever can be moved into the automatic track or into the manual shifting mode by means of a swiveling movement by the second shaft as the swiveling shaft.

According to a refinement of the invention, it is provided that the second shaft is oriented essentially perpendicular to the first shaft, and that the suspension is configured to hold two bearing bolts of the first shaft that are opposite from each other in the axial extension for purposes of achieving a pivotable mounting of the suspension with respect to the first shaft. Towards this end, on the opposite end sections, the suspension preferably has bearings in which the end sections of the bearing bolts of the first shaft that are opposite from each other come to rest. The first shaft or its bearing bolts are not configured to be continuous, so to speak, but rather the suspension is located between them, whereby the second shaft is mounted on bearings in the suspension in the interstice formed by the suspension between the two end sections of the first shaft, whereby the longitudinal extensions of the two shafts are at an angle of about 90° relative to each other.

According to a refinement of the invention, it is provided that another magnetic element is arranged on the lever at a radial distance from the swiveling shaft, in other words, from the first and/or second swiveling shaft, and the position of said magnetic element can be detected by means of a single magnetic position sensor attached to the suspension or on a circuit board arranged thereon. This magnetic position sensor serves to detect the swiveling movement or the swiveling position of the lever with respect to its suspension, whereby, when properly calibrated, this position sensor, like the rotation angle sensor, also allows a direct association with the position or angle position of the lever on the basis of the value or the algebraic sign of an electric signal brought about by the associated magnetic element.

This magnetic position sensor can be arranged in a circuit board plane that runs perpendicular to the axial extension of the second shaft. A swiveling movement of the lever with respect to the suspension thus causes a pivoting of the lever parallel to the circuit board plane. On the basis of the resulting change in the distance between the magnetic element arranged on the lever and the position sensor arranged on the circuit board, and on the basis of the electric signals that can be derived from this, one can fundamentally achieve a precise determination of the position and angle position of the lever with a single position sensor and rotation angle sensor.

The magnetic position sensors and rotation angle sensors put forward according to the invention can each have two sets of individual magneto-sensitive elements in order to ultimately be able to provide redundancy and enhanced protection against malfunction of the rotation angle detection.

Furthermore, according to an especially advantageous embodiment of the invention, it is provided that at least three or more sensor elements provided for detecting the position of the lever are arranged next to each other along the swiveling direction of the lever on the suspension or on the circuit board affixed thereto. Here, it is especially provided that these several sensor elements, which are optionally directly adjacent to each other, are arranged next to each other exclusively in the swiveling direction of the lever, in other words, on the circuit board or on the suspension with a virtually constant radial component relative to the swiveling movement of the lever.

In this context, it is especially provided that the magnetic element that is associated with the sensor elements and that is arranged on the lever is configured to simultaneously activate at least two sensor elements arranged next to each other in the swiveling direction. This translates into a redundancy in case one of the sensor elements has a malfunction or fails completely. The position of the swiveling lever inside the suspension can still always be determined unambiguously and reliably from the information from the other sensor elements.

DESCRIPTION OF THE DRAWINGS

Additional objectives, features as well as advantageous effects of the present invention are elaborated upon making reference to the embodiments explained in the figures. In this context, all of the features presented in the form of text or images in meaningful combinations constitute the subject matter of the present invention; this also applies irrespective of the patent claims and the claims to which they refer back.

The following is shown.

DETAILED DESCRIPTION OF EMBODIMENTS

Figure 1:
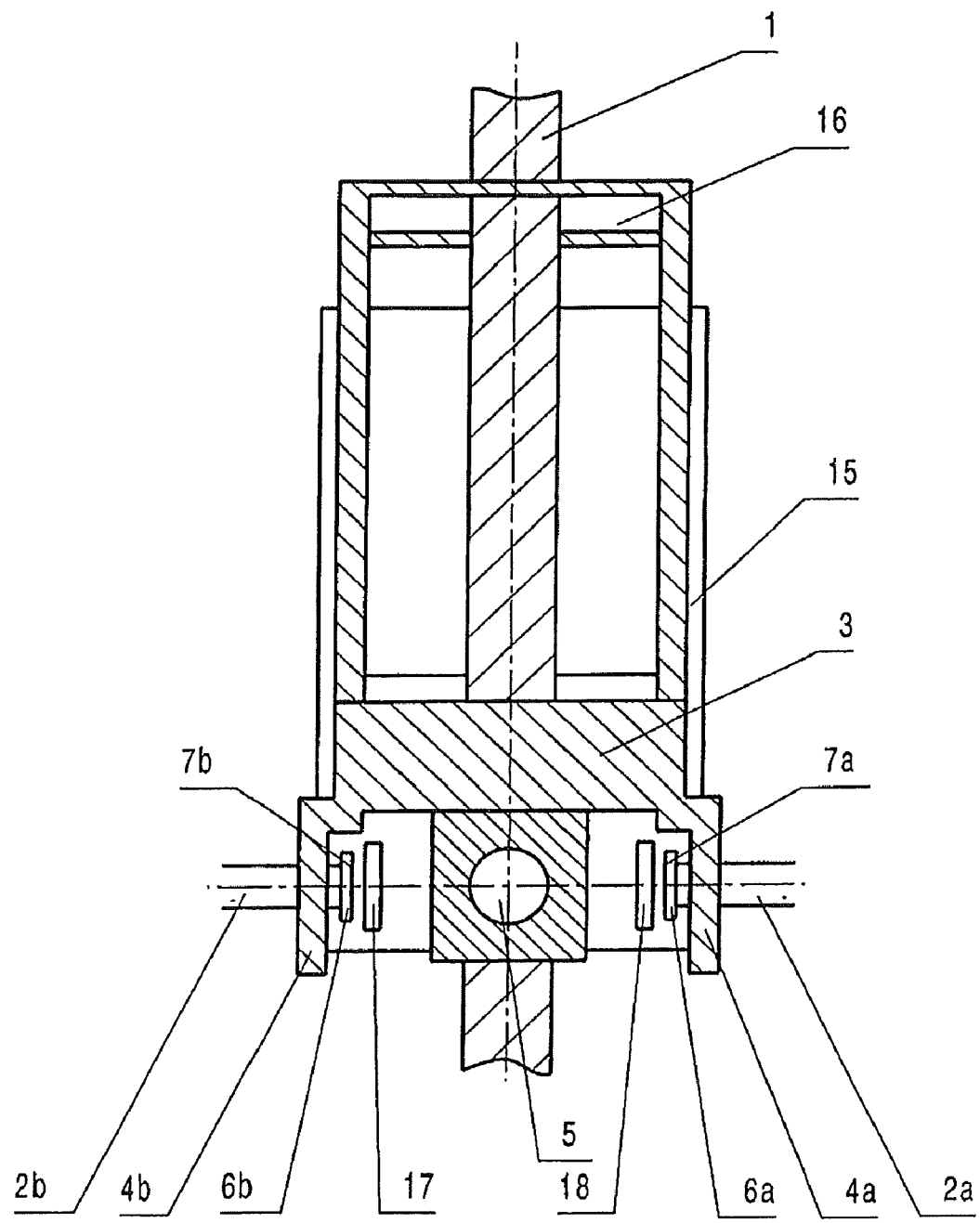
FIG. 1—a schematic depiction of the transducer device having a gearshift or selector lever mounted on a swiveling shaft by means of a suspension.
Figure 2:
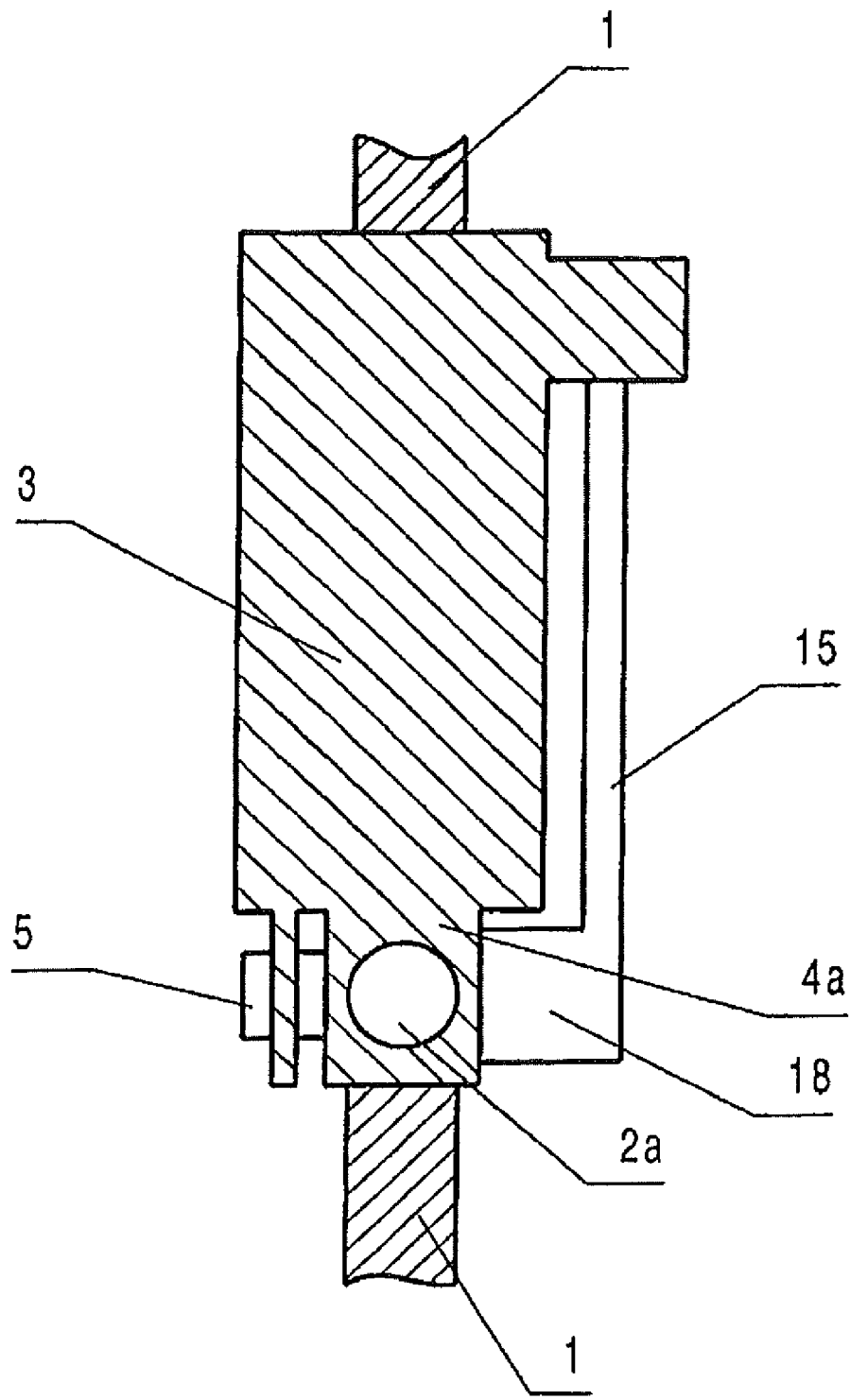
FIG. 2—a side view of the embodiment according to FIG. 1.
Figure 3:
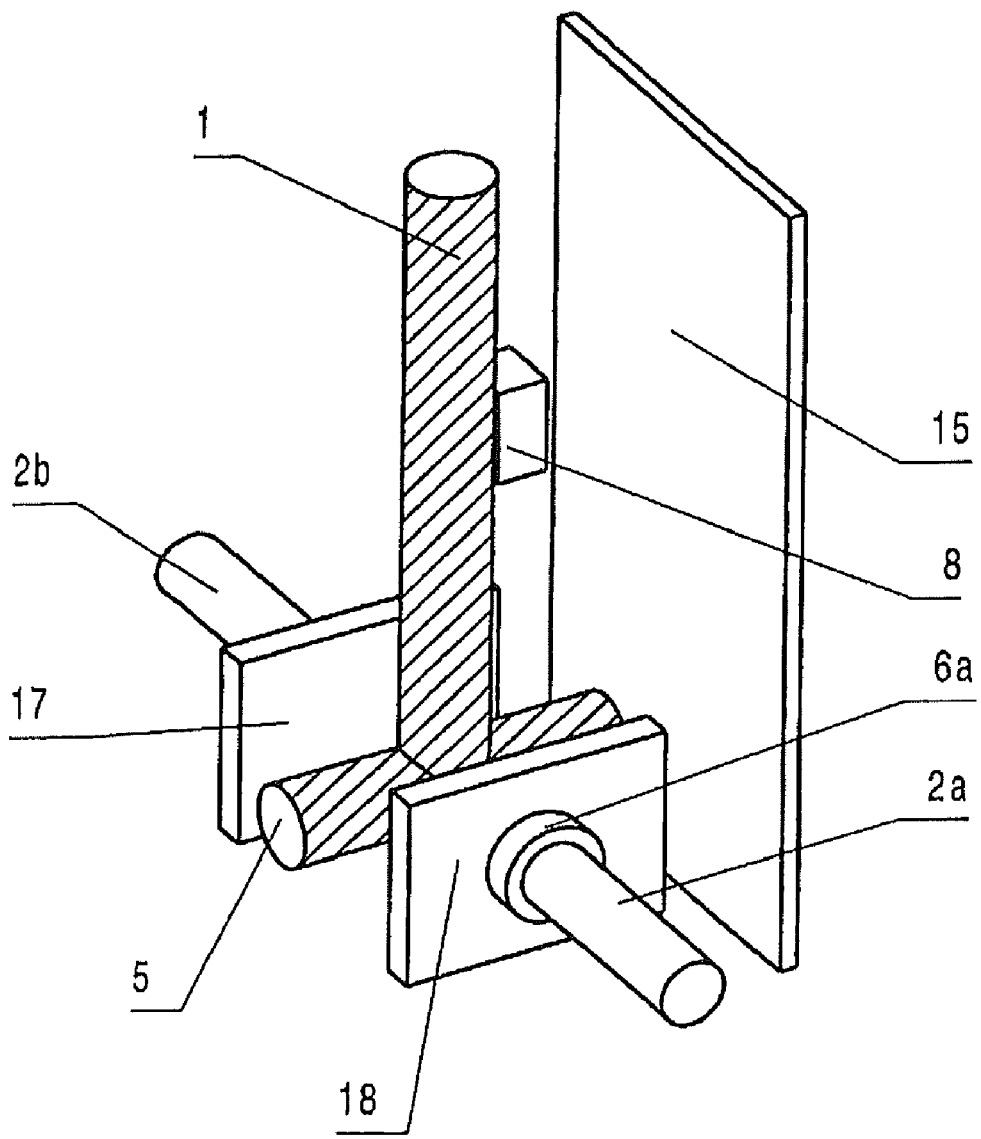
FIG. 3—a perspective view of the circuit board and of the gearshift or selector lever arranged inside the suspension.

FIGS. 1 to 3 elucidate a first embodiment of the invention for an automatic transmission of a vehicle, whereby the gearshift and selector lever 1 is pivotably mounted with respect to a first shaft 2*a*, 2*b* and with respect to a second shaft 5 in two different directions. The two different swiveling planes approximately define a manual shifting mode and the so-called automatic track in which the lever can be moved into the shifting positions P, N, R, D. The lever 1 extends through a slot 16 provided on the upper section of a suspension 3, whereby the suspension can be configured as a gearshift lever cage and has a slot 16 having a lengthwise extension running parallel to the first swiveling shaft 2*a*, 2*b*.

On both lateral ends of its lower section, the suspension 3 or the gearshift lever cage has bearing eyes 4*a*, 4*b* that hold the free end sections of the bearing bolts 2*a*, 2*b*, as a result of which the suspension 3 can be swiveled in its entirety around this first shaft 2*a*, 2*b*.

When the user exerts a swiveling movement on the lever 1 with the shaft 2*a*, 2*b* as the swiveling shaft, due to the forced guidance provided in this direction, this causes the suspension 3 to be carried along. As shown in FIGS. 2 and 3, on the suspension itself, there is a circuit board 15 that, in its lower section located at the height of the bearing bolts 2a, 2b, has flange-like projections 17, 18 on which at least one element of a rotation angle sensor arrangement is provided, while a corresponding element of the rotation angle sensor arrangement 6a, 6b is arranged at the free end section of the bearing bolts 2a, 2b.

Figure 4:
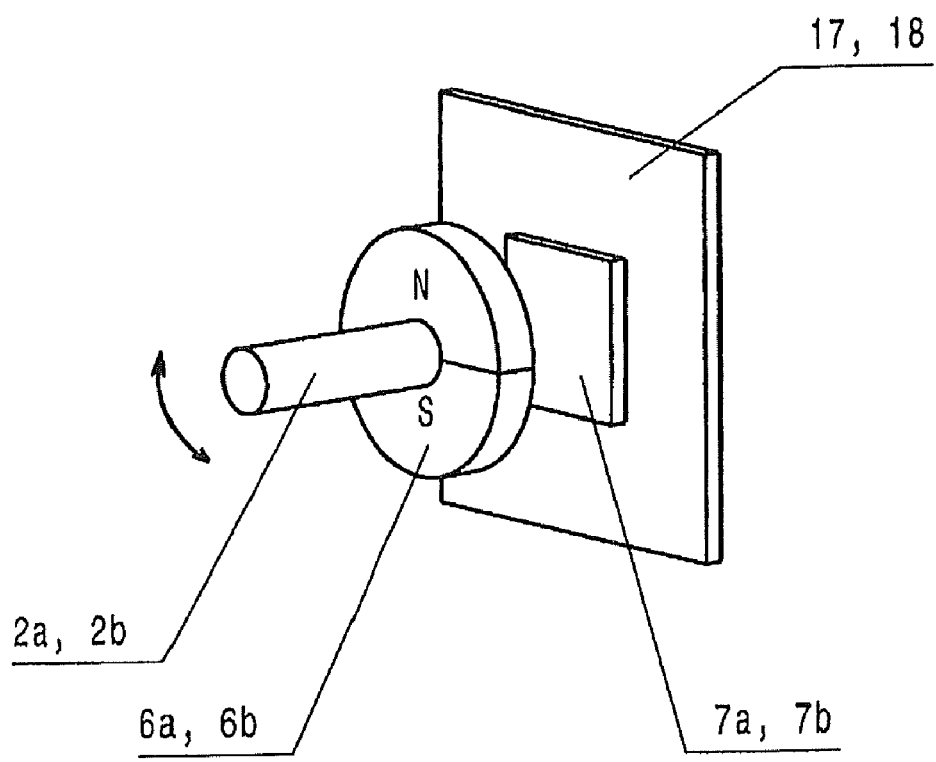
FIG. 4—a schematic and perspective view of a magnetic element-sensor pair.

Therefore, a swiveling movement of the suspension 3 leads to a corresponding swiveling movement of the circuit board 15 arranged on it and of the rotation angle sensor elements 7a, 7 arranged in the area of the flange-like projections 17, 18. Opposite from the rotation angle sensor elements 7a, 7b, each bearing bolt 2a, 2b has a magnetic element 6a, 6b that generates a magnetic field and that, as shown in FIG. 4, can have, for instance, a circular outer contour and whose angular position can be directly converted into an unambiguous electric signal by the rotation angle sensor element 7a, 7b that comes to lie opposite from said magnetic element 6a, 6b.

In particular, the magnetic element 6a, 6b is configured as a permanent magnet. However, depending on the requirement profile, it can also be provided in the form of an electromagnet.

Instead of the concrete embodiment shown, in which the rotation angle sensor elements 7a, 7b are arranged stationary with the suspension 3 and the magnetic elements 6a, 6b that generate a magnetic field are arranged on the shaft 2a, 2b, it is likewise possible to provide the opposite arrangement, in which the sensor elements and optionally an appertaining circuit board are arranged stationary relative to the support structure of the vehicle, while the magnetic elements that generate a magnetic field are arranged on the pivotably mounted lever 1 or on the suspension 3 that is operationally connected to it, for instance, the gearshift lever cage.

Figure 6:
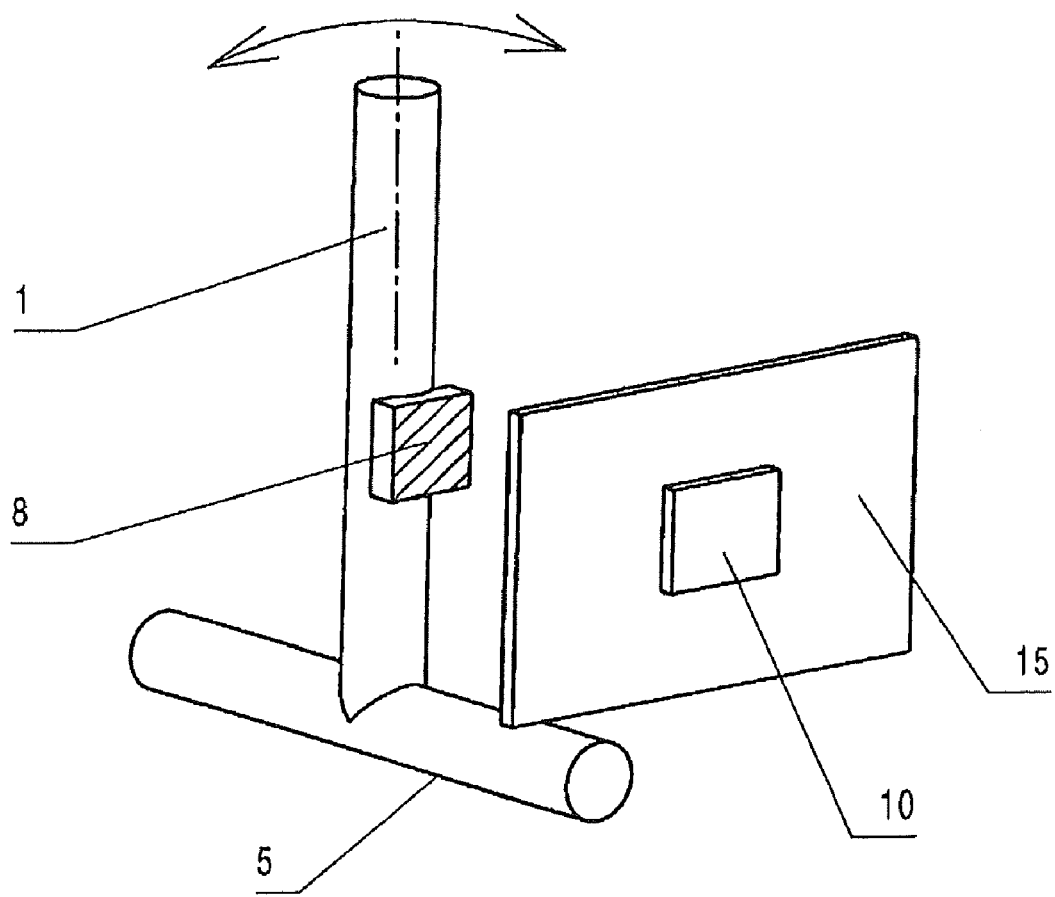
FIG. 6—a schematic and perspective view of a magnetic element arranged on the gear-shift, with the appertaining sensor elements.
Figure 7:
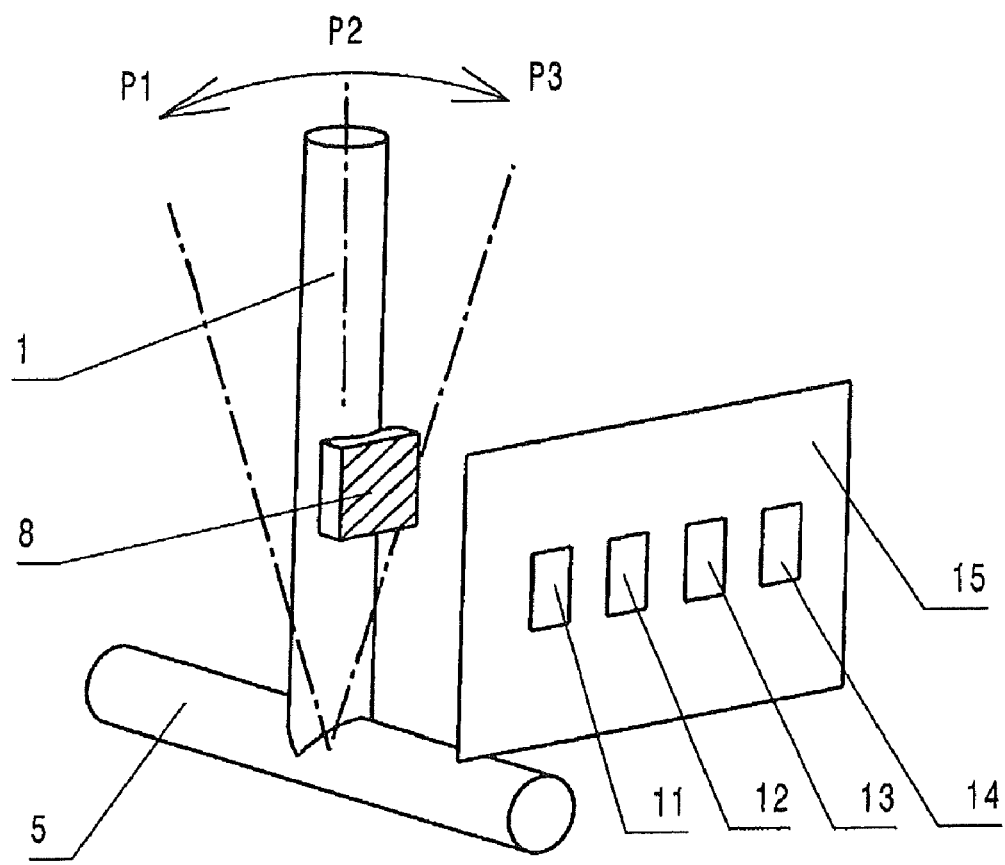
FIG. 7—an alternative configuration of the embodiment according to FIG. 6, with several sensor elements arranged next to each other in the swiveling direction.

On its end section located at the bottom in FIGS. 1 and 2, the gearshift lever cage or the suspension 3 has, between the two free ends of the shaft 2a, 2b, a swiveling shaft 5 that runs parallel thereto and that is rigidly coupled to the lever 1, as can best be seen in FIG. 3. On the section of the lever 1 facing the circuit board 15, another magnetic element 8 is provided at a radial distance from the swiveling shafts 5, 2a, 2b, whereby the position of said element in the case of a swiveling movement by the shaft 5 as the swiveling shaft can be determined by other sensor elements 10, 11, 12, 13, 14 arranged on the circuit board 15, as indicated in FIGS. 6 and 7.

The swiveling movement relative to the first shaft 2a, 2b that can be detected by means of the sensors 7a, 7b can take place completely independently of the angular position of the lever 1 with respect to the gearshift lever cage 3 and to the swiveling position relative to the shaft 5. After all, the gearshift lever cage 3 is mounted so as to be stationary vis-à-vis the lateral tilting movement of the lever 1, as shown in FIG. 1. By the same token, of course, the positioning of the swiveling lever 1 relative to the swiveling shaft 5 can also take place independently of the just assumed swiveling position of the gearshift lever cage 3.

The measuring arrangement indicated in FIG. 4 provides a sensor 7a, 7b that is configured so as to be flat and that is arranged essentially parallel to the circuit board plane 15, 17. The magnetic field that can be generated by the permanent magnets 6a, 6b can be broken down in the sensor 7a, 7b into magnetic-field components that are orthogonal and that run in the circuit board plane. A rotation of the permanent magnets 6a, 6b around the shaft 2a, 2b translates into a corresponding change in the measurable magnetic field components that provide information about the concrete angular position of the magnets 6a, 6b in terms of the orientation of the sensor element 7a, 7b.

Figure 5:
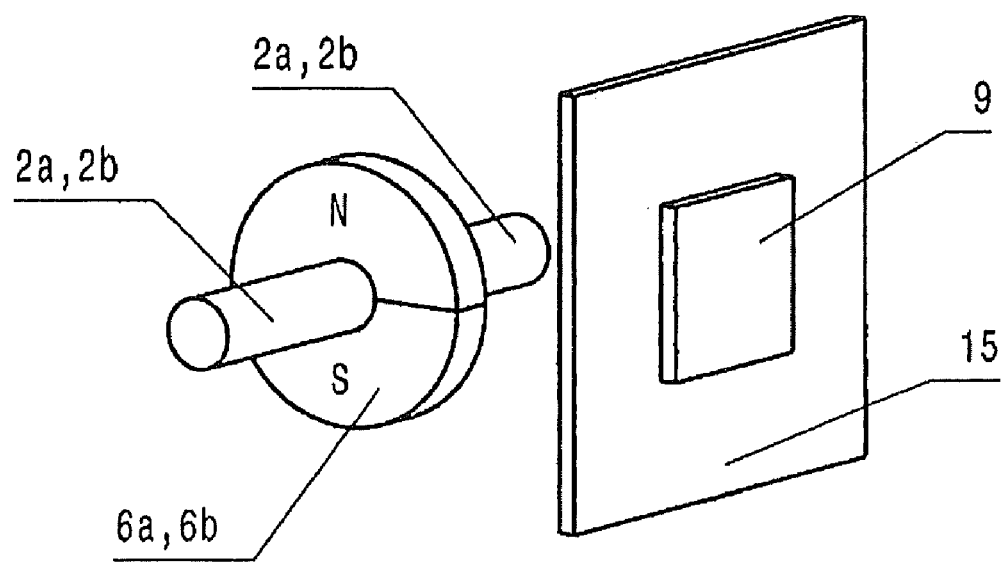
FIG. 5—an alternative configuration of a rotation angle sensor arrangement.

The alternative or supplementary arrangement according to FIG. 5 shows a sensor 9 whose surface normal runs radially to the rotation shaft 2a, 2b. Here, as well, provided that proper calibration has taken place, it is possible to unambiguously associate the angular position of the magnetic element 6a, 6b on the basis of the electric signals that can be generated by the sensor 9. In this case, however, the magnetic field that is present at the sensor 9 and that comes from the magnetic element 6a, 6b is not broken down into various magnetic-field components in the plane of the sensor 9, but rather, only a magnetic-field component running in the vertical direction in FIG. 5 is determined in terms of its orientation and magnetic-field strength.

A very similar situation is observed with the relative arrangement of the magnetic element 8—and its associated position sensor 10—arranged on the lever 1. Here, especially on the basis of the amplitude of the picked-up measuring signal and assuming a calibration has been previously carried out, it is possible to precisely associate the measured signals to corresponding swiveling positions of the lever 1.

Finally, FIG. 7 shows another alternative embodiment, whereby a plurality of sensor elements that are arranged next to each other, optionally physically separate from each other, especially individual Hall sensors 11, 12, 13, 14, are arranged on a circuit board 15 whose circuit board plane extends parallel to the swiveling plane of the lever 1 relative to the swiveling shaft 5. The alternating configuration of the magnetic element 8 and the sensors 11, 12, 13, 14 is such that the sensor elements 11, 12, 13, 14 configured in the manner of a switch are doubly activated each time at the prescribed positions P1, P2 and P3. If the lever 1, is, for instance, in position P1, the two first adjacent sensors 11, 12 generate an electric signal. In position P2, the two sensors 12 and 13 are active, whereas in position P3 of the lever 1, the two last sensors 13 and 14 generate a signal that can be evaluated electrically.

If one of these sensors should malfunction, then, on the basis of the switching states of the other sensors, precise and unambiguous information can be obtained about the currently present shifting or selecting position.

The truth table presented below illustrates this. If, for example, sensor 12 fails in position P2, then sensor 13 continues to emit a signal. Due to the fact that the sensor 14 is not currently generating a signal and due to the additional information indicating that sensor 12 has malfunctioned, the other three functioning sensors 11, 13 and 14 can precisely and unambiguously determine the current position P1, P2 or P3 of the lever 1.

|    | 11 | 12 | 13 | 14 |
|----|----|----|----|----|
| P1 | 1  | 1  | 0  | 0  |
| P2 | 0  | 1  | 1  | 0  |
| P3 | 0  | 0  | 1  | 1  |

Figure 8:
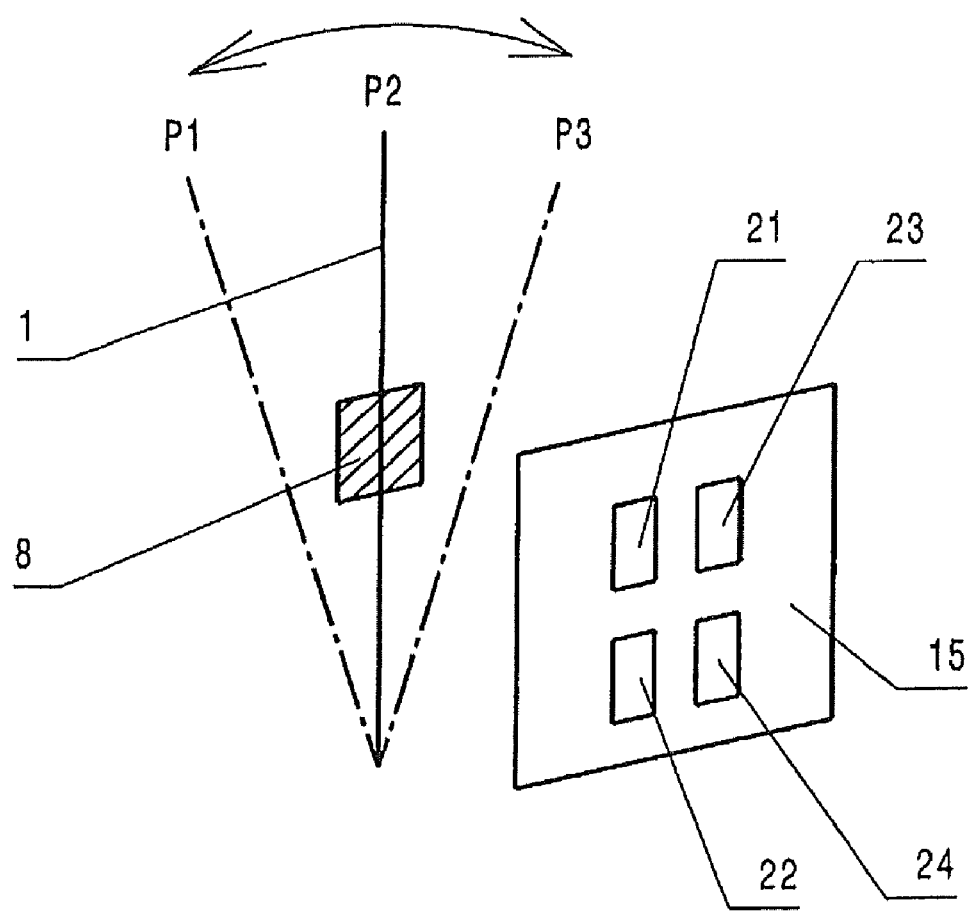
FIG. 8—another arrangement of four individual sensor elements arranged next to and above each other.

FIG. 8 shows another embodiment of a redundant detection of the angular position of the lever 1. In contrast to the presentation according to FIG. 4, the four sensor elements 21, 22, 23, 24 given here by way of an example are arranged above each other as well as next to each other, virtually in a square with respect to each other. Here, too, it is provided that the magnet 8 affixed to the lever 1 can be detected by at least two of the sensors 21, 22, 23, 24, thus yielding, in the final analysis, the following truth table:

|    | 21 | 22 | 23 | 24 |
|----|----|----|----|----|
| P1 | 1  | 1  | 0  | 0  |
| P2 | 1  | 1  | 1  | 1  |
| P3 | 0  | 0  | 1  | 1  | whereby, an unambiguously associatable signal can be generated in this case as well, even if the electronic system is not capable of indicating which of the sensors has malfunctioned.

While preferred embodiments of the invention have been described and illustrated here, various changes, substitutions and modifications to the described embodiments will become apparent to those of ordinary skill in the art without thereby departing from the scope and spirit of the invention.

List of Reference Numerals

| 1      | gearshift lever     |
|--------|---------------------|
| 2a, 2b | shaft, bearing bolt |
| 3      | suspension          |
| 4a, 4b | bearing eyes        |
| 5      | swiveling shaft     |
| 6a, 6b | magnets             |
| 7a, 7b | sensors             |
| 8      | permanent magnet    |
| 9      | sensor              |
| 10     | sensor              |
| 11     | sensor              |
| 12     | sensor              |
| 13     | sensor              |
| 14     | sensor              |
| 15     | circuit board       |
| 16     | slot                |
| 17     | projection          |
| 18     | projection          |

The invention claimed is:

1. An electromechanical transducer device for controlling at least one function of a vehicle transmission or vehicle drive arranged physically separate from the transducer, comprising:
a lever (1) adapted so as to swivel around at least one first shaft (2a, 2b), said lever being mechanically uncoupled from the transmission or drive and being mounted on the first shaft (2a, 2b) by means of a suspension (3),
a first component (6a, 6b) of a magnetic rotation angle sensor arrangement (6a, 6b, 7a, 7b) on an axial end section of the shaft (2a, 2b), a second component (7a, 7b) of the magnetic rotation angle sensor arrangement arranged on the suspension (3), opposite from the end section of the shaft (2a, 2b), with the axial end section inside the suspension (3), said first component (6a, 6b) cooperating with said second component (7a, 7b) to directly detect angle position or rotational movement of the lever (1), and
a circuit board (15) arranged on the suspension (3), said circuit board (15) defining a plane and holding the second component (7a, 7b), wherein the circuit board (15) has at least one flange-like or substantially flange-like extension (17, 18) that protrudes from the plane of the circuit board, said extension being configured to hold at least one of the first component or second component of the rotation angle sensor arrangement (7a, 7b), and coming to lie with its surface normal essentially parallel to the first shaft (2a, 2b).

2. The transducer device according to claim 1, wherein the second component of the rotation angle sensor arrangement is a single rotation angle sensor (7a, 7b) for purposes of determining the angle position of the lever (1) relative to the first shaft (2a, 2b).

3. The transducer device according to claim 1, wherein the first component (6a, 6b) of the rotation angle sensor arrangement (6a, 6b, 7a, 7b) is a magnetic element that generates a magnetic field and the second component (7a, 7b) of the rotation angle sensor arrangement (6a, 6b, 7a, 7b) is a rotation angle sensor.

4. The transducer device according to claim 1, wherein at least one of the first components or second components (6a, 6b, 7a, 7b) of the rotation angle sensor arrangement is arranged non-rotatably on a face of the axial end section of the shaft (2a, 2b), and the corresponding other of the first component or second component (6a, 6b, 7a, 7b) is arranged on the suspension (3) at a position corresponding to an imaginary axial extension of the shaft (2a, 2b).

5. The transducer device according to claim 4, wherein the rotation angle sensor (7a, 7b) is essentially flat and has its surface normal essentially parallel to the first shaft (2a, 2b).

6. The transducer device according to claim 1, wherein the first component (6a6b) is on the shaft (2a, 2b), and the second component (7a, 7b) is oriented with respect to the shaft with its surface normal facing in the radial direction relative to the shaft (2a, 2b).

7. The transducer device according to claim 1, wherein the lever (1) passes through a slot of the suspension (3) at a radial distance from the first component (2a, 2b), said slot extending parallel to the first component (2a, 2b) and limiting a swiveling movement of the lever (1) around a second shaft (5) relative to the suspension (3).

8. The transducer device according to claim 7, wherein the first component (2a, 2b) is a shaft, and the shaft and the second shaft (5) are oriented essentially perpendicular with respect to each other, and the suspension (3) is configured to hold two bearing bolts of the first component (2a, 2b) that are opposite from each other in the axial extension for purposes of achieving a pivotable mounting of the suspension (3) relative to the first component (2a, 2b).

9. The transducer device according to claim 1, wherein the suspension (3) is configured so as to hold a bearing bolt that extends essentially perpendicular to the first component (2a, 2b), and that is rigidly joined to the lever (1).

10. The transducer device according to claim 1, wherein another magnetic element (8) is arranged on the lever (1) at a radial distance from the first component (2a, 2b), and position of said magnetic element (8) detectable by means of a single magnetic position sensor (10) arranged on the suspension (3).

11. The transducer device according to claim 1, wherein at least three or more sensor elements (11, 12, 13, 14) provided for detecting position of the lever (1) are arranged next to each other along a swiveling direction of the lever (1) on the suspension (3) and/or on the circuit board (15) affixed thereto.

12. The transducer device according to claim 10, wherein the magnetic element (8) arranged on the lever (1) is configured to simultaneously activate at least two sensor elements (11, 12, 13, 14) arranged next to each other in the swiveling direction.

13. An electromechanical transducer for a vehicle transmission, comprising:
a lever mechanically uncoupled from the transmission, wherein said lever is pivotally actuated about a shaft defining at least one first axis and supported on a suspension;
a magnetic rotational angle sensor disposed at an axial end section of the shaft;

a second rotational angle sensor cooperating with the first magnetic rotational angle sensor to detect angle position or rotational movement of the lever, wherein said second rotational angle sensor is located within the suspension; and a circuit board on the suspension, said circuit board defining a plane and holding the second rotational angle sensor, wherein the circuit board has at least one flange extension that protrudes from the plane of the circuit board and onto which the second rotational angle sensor is held opposite from the axial end section of the shaft, wherein said flange extension lies with its surface normal essentially parallel to the shaft.

* * * * *